(12) United States Patent
Beutin et al.

(10) Patent No.: US 7,549,603 B2
(45) Date of Patent: Jun. 23, 2009

(54) DEFLECTION SYSTEM FOR A GAS STREAM IN A NOZZLE

(75) Inventors: Bruno Albert Beutin, Evry (FR); Jeremy Edmond Fert, Paris (FR)

(73) Assignee: SNECMA, Paris (FR)

( * ) Notice: Subject to any disclaimer, the term of this patent is extended or adjusted under 35 U.S.C. 154(b) by 677 days.

(21) Appl. No.: 11/386,740

(22) Filed: Mar. 23, 2006

(65) Prior Publication Data
US 2006/0226282 A1 Oct. 12, 2006

(30) Foreign Application Priority Data
Mar. 23, 2005 (FR) .................................. 05 02879

(51) Int. Cl.
*B64C 15/02* (2006.01)
(52) U.S. Cl. .................... 244/23 D; 244/62; 239/265.19
(58) Field of Classification Search .............. 244/23 D, 244/23 R, 62, 73 R, 74, 73 B; 60/231; 239/265.17, 239/265.19
See application file for complete search history.

(56) References Cited

U.S. PATENT DOCUMENTS

| 3,221,498 A | 12/1965 | Bankston |
| 3,427,809 A | 2/1969 | Lavoie |
| 4,063,685 A | 12/1977 | Jacobs |
| 6,679,048 B1 | 1/2004 | Lee et al. |

FOREIGN PATENT DOCUMENTS

| DE | 1 198 145 | 8/1965 |
| FR | 1075067 | 10/1954 |
| FR | 1030483 | 6/1955 |
| FR | 1362403 | 6/1964 |

*Primary Examiner*—Timothy D Collins
(74) *Attorney, Agent, or Firm*—Oblon, Spivak, McClelland, Maier & Neustadt, P.C.

(57) ABSTRACT

Deflection system for a gas stream 11 in an exhaust nozzle 10 of a flying craft, comprising fixed structural housings 18,20 which extend perpendicularly to the gas stream 11 and which are fed with deflection gas through one of their ends external to the nozzle 10, these housings 18,20 containing in their side walls 22,28 gas injection slits 23,30 oriented in oblique directions 24,26 relative to the gas stream 11, and controlled means for the adjustable closure of these slits 23,30.

14 Claims, 3 Drawing Sheets

DEFLECTION SYSTEM FOR A GAS STREAM IN A NOZZLE

FIELD OF THE INVENTION

The present invention relates to a deflection system for a gas stream in an exhaust nozzle of a flying craft, such as, in particular, a drone.

BACKGROUND OF THE INVENTION

The installation of a deflection system for a gas stream flowing in the exhaust nozzle of a flying craft allows the rudder of this flying craft to be eliminated, which rudder, when it is actuated, emits an electromagnetic signal which is locatable by radar.

A traditional deflection system comprises injection means for injecting pressurized gas in a given direction into the gas stream flowing in the nozzle and control means for controlling the gas flow leaving the injection means, the zigzagging of the flying craft being controlled by deflection of the gas stream to the left or the right in directions substantially symmetrical to the longitudinal axis of the nozzle.

A particular object of the invention is to improve the flight performance and piloting accuracy of this type of flying craft.

SUMMARY OF THE INVENTION

For this purpose, it proposes a deflection system for a gas stream in an, exhaust nozzle of a flying craft, comprising injection means for injecting pressurized gas in a given direction into the gas stream flowing in the nozzle and control means for controlling the gas flow leaving the injection means, characterized in that the gas injection means comprise fixed structural housings which extend inside the nozzle perpendicularly to the gas stream flowing in the nozzle and which are fed with deflection gas through one of their ends external to the nozzle, these housings containing in their side walls gas injection slits oriented in given directions relative to the flow direction of the gas stream in the nozzle, and controlled means for the adjustable closure of these injection slits.

The adjustable closure of the side slits of the structural housings allows the deflection to be controlled in one direction or the other and the gas flow leaving these side slits to be regulated.

In a simple manner, the said controlled close-off means comprise flaps mounted inside the said housings and displaceably guided along the injection slits, these flaps being connected to actuating means situated outside the housings and the nozzle.

The flaps are advantageously displaceable between a closure position of the injection slits and two extreme positions for the opening of slits orientated in a given direction and for the closure of slits oriented in the other direction, and vice versa.

The actuating means for the flaps of different housings are advantageously connected to a common control means, such as a jack, for example.

In a first embodiment of the invention, the flaps are mounted rotationally inside the housings and each comprise an axial rotary-drive shaft, which extends outside the housing.

The aforesaid common control means can in this case comprise a rack extending along the housings outside the nozzle and engaging with pinions supported by the ends of the aforesaid shafts on which the flaps are mounted.

In a second embodiment of the invention, the flaps are mounted slidingly inside the housings, the flap(s) of each housing being connected, by a shaft extending outside both the housing and the nozzle, to a crossbar which extends along the housings outside the nozzle and which is actuated by the aforesaid common control means.

The structural housings are preferably situated at the exit throat of the nozzle in order to improve the effectiveness of the zigzagging deflection, and are at least three in number and advantageously four in number, two lateral housings being arranged at the ends of a cross section of the nozzle, and a third housing being in the middle of the nozzle or two other housings being situated in this cross section at an equal distance apart and equidistant from the lateral housings.

The housings are fed with deflection gas by the drawing-off of pressurized gas in a zone upstream of the engine of the flying craft, for example from a compressor of the engine.

BRIEF DESCRIPTION OF THE DRAWINGS

The invention will be better understood and other advantages and characteristics of the invention will become apparent from the reading of the following description given by way of non-limiting example with reference to the appended drawings, in which.

DETAILED DESCRIPTION OF THE DRAWINGS

Figure 1:
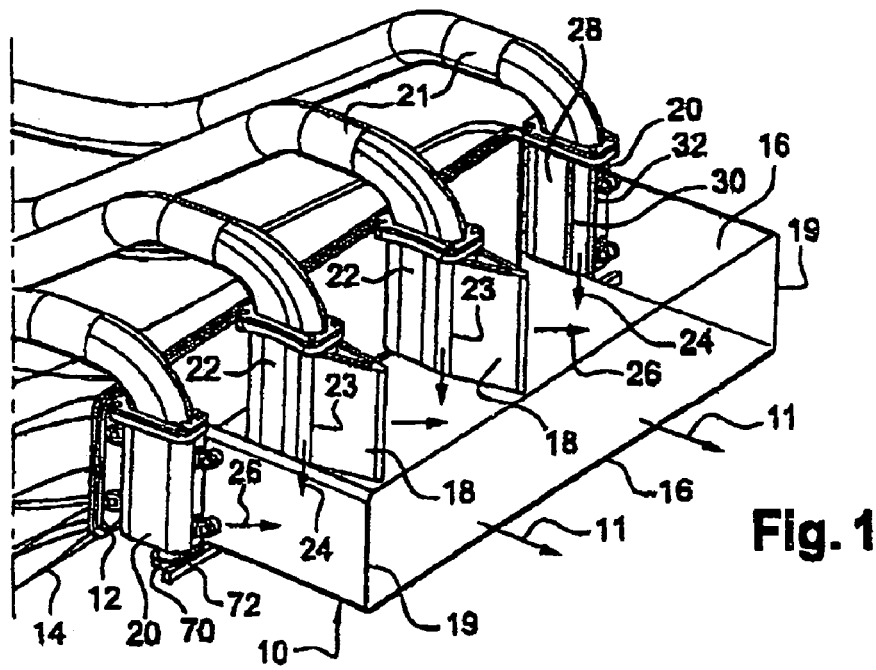
FIG. 1 is a partial diagrammatic perspective view of an exhaust nozzle of a flying craft equipped with a deflection system according to the invention.

Reference is first made to FIG. 1, which represents diagrammatically in perspective an exhaust nozzle 10 of a gas stream 11 of a flying craft, especially of a drone, the upstream end 12 of the nozzle being fixed by suitable means to the downstream end of an outer casing 14 of the engine (not represented) of the flying craft.

The nozzle 10 has a rectangular shape in cross section and comprises two large walls 16, between which two structural housings 18, fixed at their ends on these walls 16, extend perpendicularly, and two small walls 19, which connect the ends of the large walls 16 of the nozzle and on each of which a structural housing 20 is fixed.

The walls 16 and 19 are simple in shape in the represented example, but, as a variant, can be more complex in shape.

The structural housings 18, 20 allow pressurized gas to be injected in given directions into the gas stream 11 flowing in the nozzle in order to deflect the thrust of the zigzagging flying craft.

These housings are situated substantially at an equal distance apart and are connected by one of their ends to deflection-gas supply pipes 21 which extend along the outer casing 14 of the engine as far as an air intake situated in the engine for the drawing-off of pressurized gas.

The structural housings 18 have a profiled shape in cross section and comprise on each of their side walls 22 at least one slit 23 formed on a middle portion of this profiled shape and extending over a majority of the height of the housings 18.

The slits 23 of the side faces 22 visible in FIG. 1 are intended to inject pressurized gas in a direction 24 into the gas stream 11 flowing in the nozzle, and the slits 23 of the side faces 22 not visible in FIG. 1 are intended to inject pressurized gas in a direction 26 into the gas stream 11 flowing in the nozzle, the directions 24 and 26 being substantially symmetrical to the longitudinal axis of the nozzle 10.

The structural housings 20 at the lateral ends of the nozzle are outside the nozzle and have a substantially parallelepipedal shape. On their walls 28 placed against the side walls 19 of the nozzle, they comprise slits 30 formed on end portions downstream of these walls 28, which slits extend over a majority of the height of the housings 20 and are aligned with slits 32 formed in the side walls 19 of the nozzle.

The slit 30 which is visible in FIG. 1 is intended to inject pressurized gas in the aforesaid direction 24 into the gas stream 11 flowing in the nozzle, and the slit 30 of the other housing 20, not visible in FIG. 1, is intended to inject pressurized gas in the aforesaid direction 26 into the gas stream 11 flowing in the nozzle.

Figure 2:
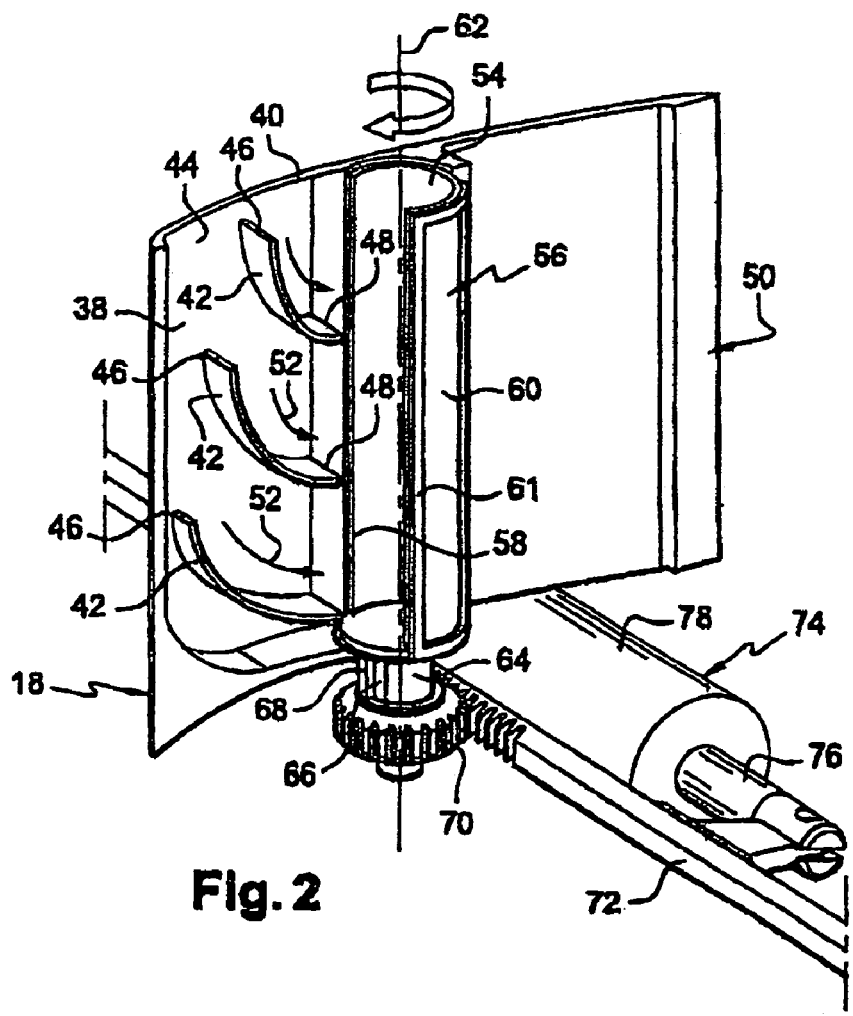
FIG. 2 is a diagrammatic perspective view, with partial cut-away, of a structural housing of the deflection system of FIG. 1.
Figure 3:
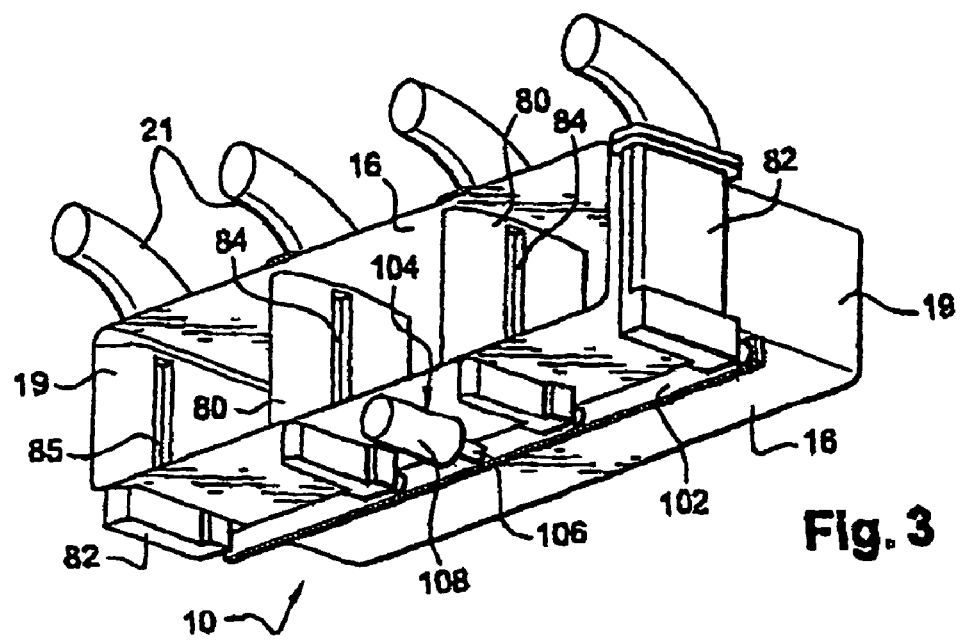
FIG. 3 is a diagrammatic perspective view of the exhaust nozzle equipped with an embodiment of the deflection system according to the invention.
Figure 4:
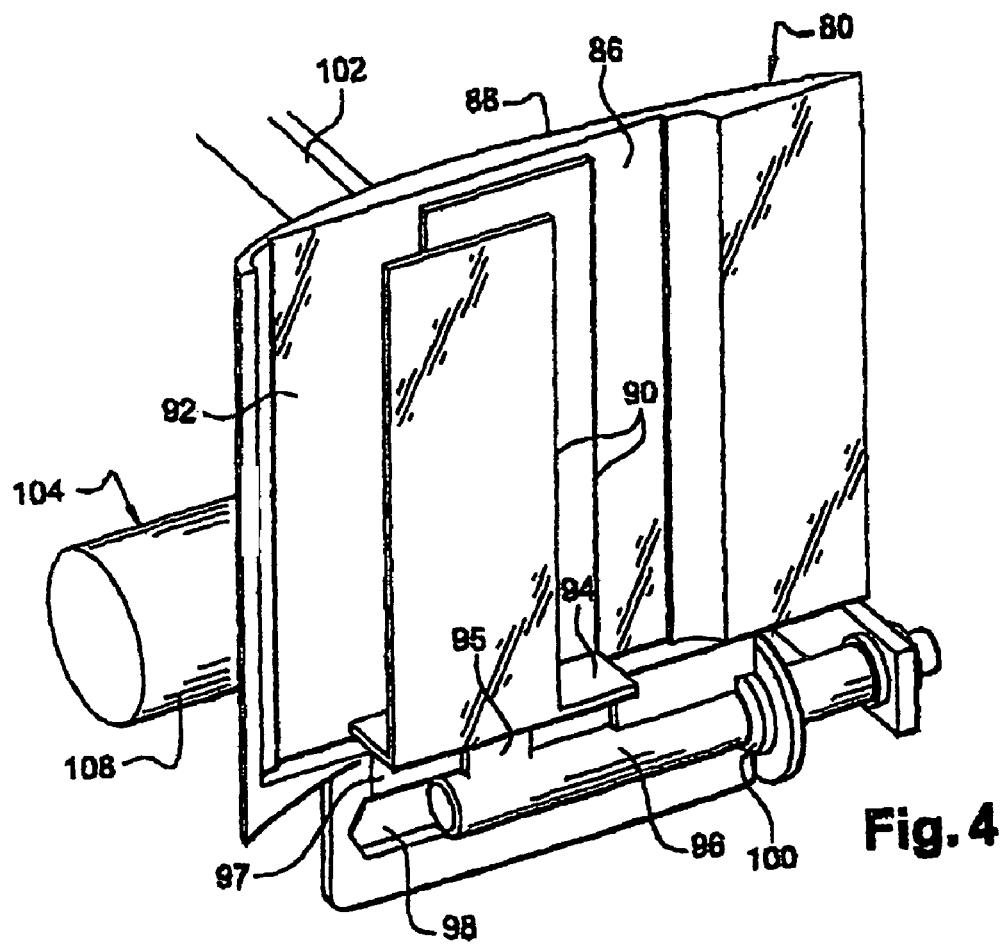
FIG. 4 is a diagrammatic perspective view, with partial cut-away, of a structural housing of the deflection system of FIG. 3.

FIG. 2 is a diagrammatic perspective view of one half of a structural housing 18 of FIG. 1, which comprises an upstream receiving chamber 38 of the gases drawn off from the compressor and led through a pipe 21 to the end 40 of the housing, this chamber containing inner straightening vanes 42 for the gas stream, each extending concavely between the inner side faces 44 of this chamber, and having an end 46 directed towards the supply end 40 of the housing and an end 48 oriented towards the downstream edge 50 of the housing, substantially parallel to the axis of the nozzle.

The gas stream circulating in the housing, represented diagrammatically by the arrows 52, is oriented towards a cylindrical duct 54 extending axially over the majority of the height of the housing downstream of the chamber 38, and in the cylindrical wall of which are formed the aforesaid injection slits 23 (not visible) for injecting pressurized gas into the gas stream flowing in the nozzle.

A tubular cylindrical flap 56 is mounted rotationally in the duct 54 of the housing and comprises, upstream, a longitudinal inlet opening 58 for gas from the chamber 38, and a cylindrical wall 60, on which there is formed at least one slit intended to coincide with a slit 23 of the housing.

The housings 18 likewise comprise rectangularly shaped seals 61, which are mounted at the periphery of the slits 23 between the flap 56 and the cylindrical duct 54 containing the injection slits.

The flap 56 is rotary driven about its axis 62 by means of an axial shaft 64 which is fixed to the end of the flap, on the side opposite to the supply end 40 of the housing, and which extends outside the housing 18 and the nozzle, this axial shaft 64 being centred and rotationally guided through a cylindrical sleeve 66 fitted around the shaft 64 in a cylindrical vent 68 of the housing.

The axial shaft 64 supports a pinion 70, which is engaged with a rack 72 extending transversely along the housings 18, 20 outside the nozzle 10, as represented in FIG. 1.

Each lateral housing 20 likewise comprises a chamber 38 and a duct 54, in which there is rotationally mounted a flap 56 connected at one end to an axial shaft 64 supporting pinion 70 engaged on this rack 72.

The rack is connected to a common control means, which is here a jack 74, the piston 76 of which is connected to the rack 72 and the cylinder 78 of which is mounted on the nozzle 10.

The actuation of the jack 74 drives the flaps 56 rotationally about their axes 62, these flaps being displaceable between a middle closure position of the injection slits 23, 30 and two extreme positions for the opening of the slits 23, 30 oriented in the direction 24 and for the closure of the slits 23, 30 oriented in the direction 26, and vice versa.

The rotation of the flaps 56 likewise allows the gas flow injected into the nozzle to be regulated by varying the degree of closure of the slits 23.

FIGS. 3 to 7 represent an embodiment of the deflection system according to the invention.

As in the preceding embodiment, this deflection system comprises two structural housings 80 extending vertically inside the nozzle 10 perpendicularly to the gas stream, and two lateral structural housings 82 mounted on the side walls 19 of the nozzle 10, outside the latter.

The housings 80 comprise a slit 84 on each of their side walls, and the housings 82 each comprise a slit (not visible) which is formed on their wall in contact with a side wall 19 of the nozzle 10 and is aligned with a corresponding slit 85 of this side wall 19.

Each structural housing 80 comprises (FIG. 4) an inner chamber 86 connected to the gas-supply end 88 of the housing and inside which are mounted two flat, rectangular flaps 90 slide-displaceable in vertical planes parallel to the flow direction of the gas stream in the nozzle, and each resting against an inner side face 92 of the chamber 86.

The two flaps 90 are fixed at one of their ends, staggered in their displacement direction, on a rectangular horizontal plate 94, which is connected by a vertical lug 95 to a horizontal cylindrical shaft 96 extending downstream outside the housing 80 and the nozzle 10 in a direction parallel to the gas stream.

The vertical lug 95 is translationally displaceable in a longitudinal passage 97 connecting the chamber 86 to a cylindrical receptacle 98 in which the horizontal shaft 96 is slidingly guided, which, by its downstream end portion, passes through a downstream wall of the housing in a seal tight manner by virtue of the fitting of an annular seal 100 in the opening in the wall of the housing.

Each lateral housing 82 likewise comprises an inner chamber 86 and a flap 90 for closing off the slit of the housing and for regulating the gas flow leaving through this slit.

The shafts 96 of the structural housings 80, 82 are fixed by their downstream ends to a crossbar 102 which extends along the housings outside the nozzle 10 and which is connected to a common control means, which, in the represented example, is a jack 104, the piston 106 of which is connected to the bar 102 and the cylinder 108 of which is mounted on the nozzle 10.

Figure 5:
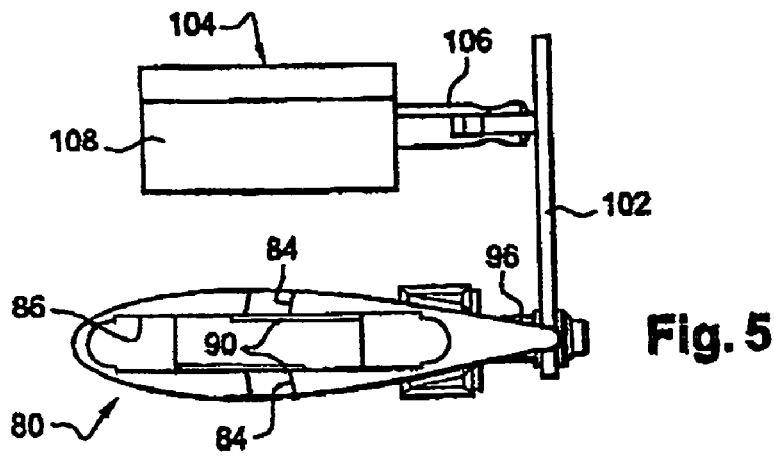
FIGS. 5 to 7 are diagrammatic cross-sectional views illustrating the different positions of the flaps relative to the injection slits of a housing in the deflection system of FIG. 3.
Figure 6:
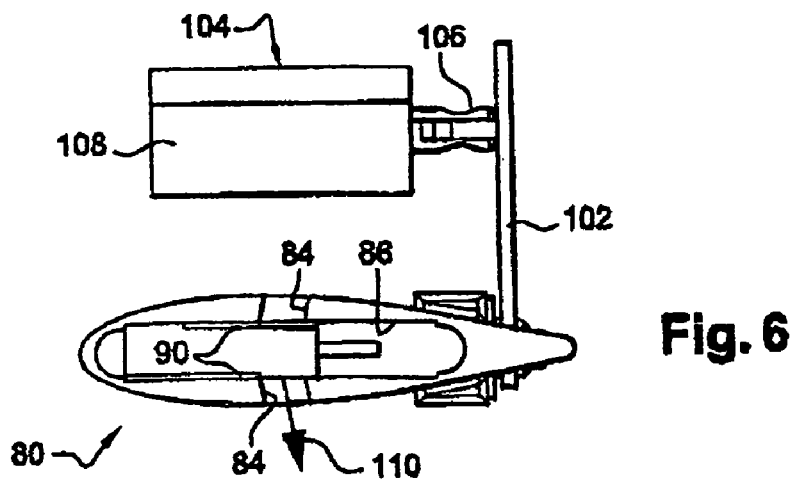
Figure 7:
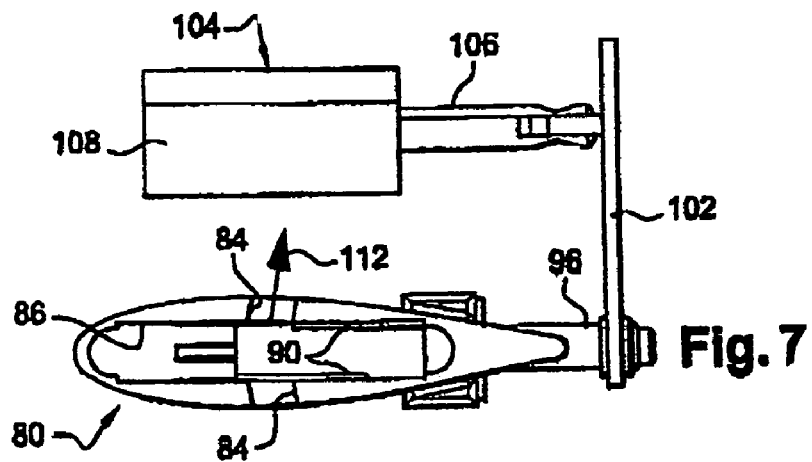

The different positions of the flaps 90 in the inner chamber 86 of a structural housing 80 are represented in FIGS. 5 to 7.

FIG. 5 represents a middle closure position of the two injection slits 84 of a housing 80, in which the flaps 90 totally close off these slits and prevent deflection gas from being injected into the nozzle.

In FIG. 6, the piston 106 of the jack has been displaced in the upstream direction, the crossbar 102 has driven the flaps 90 in sliding motion inside the chamber up to a position in which the slit 84 of a first side wall of the housing is closed off by the corresponding flap 90 and the slit of the other side wall is totally freed to allow pressurized gas to be injected through this slit in a direction 110 with a maximum gas flow.

In FIG. 7, the piston 106 of the jack has been displaced in the downstream direction, the crossbar 102 has driven the flaps 90 slidingly up to a position in which the slit 84 of the aforesaid first wall of the housing is totally freed for the injection of the pressurized gas through this slit in a direction 112 with a maximum gas flow, and the slit of the other wall is closed off by the corresponding flap 90.

All intermediate positions between the extreme positions of FIGS. 6 and 7 are possible for the injection of gas into the nozzle with a defined flow.

As a variant, the structural housings 80, 82 can comprise two slits or more on their side walls.

The deflection gases can be injected into the nozzle in a direction perpendicular to the gas stream 11 flowing in the nozzle, or in an oblique direction as represented in FIGS. 6 and 7.

The deflection system according to the invention can comprise one, two or three structural housings 18 or 80, or indeed more, which extend inside the nozzle perpendicularly to the gas stream flowing in the nozzle, these housings preferably being situated at an equal distance apart and equidistant from the side walls of the nozzle.

We claim:

1. Deflection system for a gas stream in an exhaust nozzle of a flying craft, comprising injection means for injecting pressurized gas in a given direction into the gas stream flowing in the nozzle and control means for controlling the gas flow leaving the injection means, wherein the gas injection means comprise fixed structural housings which extend inside the nozzle perpendicularly to the gas stream flowing in the nozzle and which are fed with deflection gas through one of their ends external to the nozzle, these housings containing in their side walls gas injection slits oriented in given directions relative to the flow direction of the gas stream in the nozzle, and controlled means for the adjustable closure of these injection slits.

2. Deflection system according to claim 1, wherein the said controlled close-off means comprise flaps mounted inside the said housings and displaceably guided along the said slits, these flaps being connected to actuating means situated outside the housings and the nozzle.

3. Deflection system according to claim 2, wherein the flaps are displaceable between a closure position of the injection slits and two extreme positions for the opening of slits oriented in a given direction and for the closure of slits oriented in another direction, and vice versa.

4. Deflection system according to claim 2, wherein the actuating means are connected to a common control means, such as a jack.

5. Deflection system according to claim 2, wherein the flaps are mounted rotationally inside the housings and each comprises an axial rotary drive shaft, which extends outside the housing.

6. Deflection system according to claim 5, wherein the end of the shaft external to the housing supports a pinion, which is engaged with a rack extending along the housings outside the nozzle.

7. Deflection system according to claim 5, wherein seals are mounted between the rotational flaps and the side walls of the housings containing the injection slits.

8. Deflection system according to claim 2, wherein the flaps are mounted slidingly inside the housings, the flap(s) of each housing being connected to a shaft extending outside the housing and the nozzle and fixed to a crossbar extending along the housings outside the nozzle.

9. Deflection system according to claim 1, wherein the structural housings are situated at the exit throat of the nozzle.

10. Deflection system according to claim 1, wherein it comprises at least one housing extending in the middle of the nozzle and two lateral housings arranged at the ends of a cross section of the nozzle.

11. Deflection system according to claim 1, wherein it comprises two lateral housings arranged at the ends of a cross section of the nozzle and two central housings situated at an equal distance apart and equidistant from the lateral housings.

12. Deflection system according to claim 1, wherein the housings are fed with pressurized gas by the drawing-off of gas, upstream, from the engine of the flying craft.

13. Deflection system according to claim 1, wherein the housings have a profiled shape in cross section and the pressurized gas injection slits are formed in a middle portion of this profiled shape and extend over a majority of the height of the housings.

14. Deflection system according to claim 1, wherein the housings contain inner straightening vanes for the gas stream, extending between their supply end and the injection slits.

* * * * *